(12) United States Patent
Lin et al.

(10) Patent No.: US 8,248,475 B2
(45) Date of Patent: Aug. 21, 2012

(54) CAMERA MODULE AND TESTING METHOD THEREOF

(75) Inventors: Po-Yu Lin, Taipei Hsien (TW); Chao-Chien Lee, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 390 days.

(21) Appl. No.: 12/641,548

(22) Filed: Dec. 18, 2009

(65) Prior Publication Data

US 2011/0069176 A1    Mar. 24, 2011

(30) Foreign Application Priority Data

Sep. 23, 2009   (CN) .......................... 2009 1 0307512

(51) Int. Cl.
*H04N 17/00* (2006.01)
*H04N 17/02* (2006.01)
*G06K 9/00* (2006.01)

(52) U.S. Cl. ................. 348/175; 348/187; 382/169

(58) Field of Classification Search ................ 348/175, 348/187–188, 182; 382/169
See application file for complete search history.

(56) References Cited

U.S. PATENT DOCUMENTS

| 2005/0231595 A1* | 10/2005 | Wang et al. ............ 348/187 |
| 2006/0018550 A1* | 1/2006 | Rash et al. ............. 382/218 |
| 2009/0021647 A1* | 1/2009 | Choi et al. ............. 348/655 |

FOREIGN PATENT DOCUMENTS

CN        1661456 A       8/2005

\* cited by examiner

*Primary Examiner* — Lin Ye
*Assistant Examiner* — Mekonnen Dagnew
(74) *Attorney, Agent, or Firm* — Altis Law Group, Inc.

(57) ABSTRACT

A camera module includes an image capture unit used to capture at least one image of a subject. An image analysis unit is integrated in the camera module to analyze the quality of the image captured by the image capture unit to determine whether the camera module meets one or more preset requirements. The camera module further includes an output unit used to output one or more analysis results of the image analysis unit to determine whether the camera module meets preset capability requirements.

12 Claims, 2 Drawing Sheets

CAMERA MODULE AND TESTING METHOD THEREOF

BACKGROUND

1. Technical Field

The present disclosure relates to a camera module and a testing method thereof.

2. Description of the Related Art

Developments in micro-circuitry and multimedia technology have led to camera modules being frequently deployed in portable electronic devices such as mobile phones and personal digital assistants. To facilitate portability, such camera modules not only tend to be compact, slim, and light, but also need to meet the requirements for good image quality. As a result, testing of camera modules before shipment is very important. However, such testing is typically carried out manually. For example, an image is captured using the camera module and transmitted to a computer for display. The image is then examined by an operator to determine the quality of the camera module. However, the manual test is time-consuming and inefficient.

Therefore, it is desirable to provide a camera module and a testing method thereof which can overcome the limitations described.

BRIEF DESCRIPTION OF THE DRAWINGS

Many aspects of the present camera module and testing method thereof could be better understood with reference to the accompanying drawings. The components in the drawings are not necessarily drawn to scale, the emphasis instead being placed upon clearly illustrating the principles of the camera module and testing method thereof. Moreover, in the drawings, like reference numerals designate corresponding parts throughout the several views.

DETAILED DESCRIPTION

Embodiments of the present camera module will be now described in detail with reference to the drawings.

Figure 1:
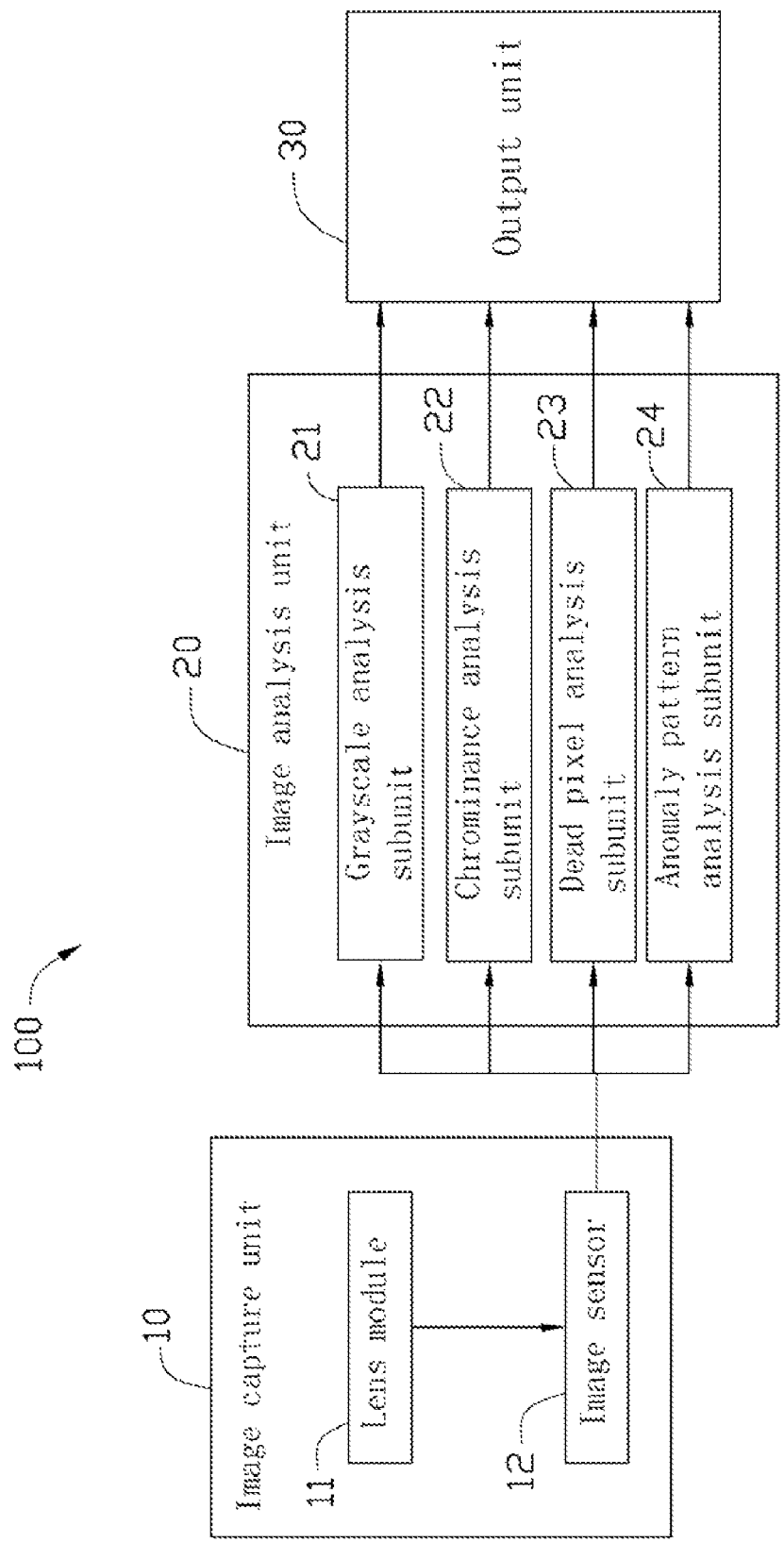
FIG. 1 is a functional block diagram of a camera module, according to an exemplary embodiment.

Referring to FIG. 1, a camera module 100 according to an exemplary embodiment, is shown. The camera module 100 includes an image capture unit 10, an image analysis unit 20 and an output unit 30. The image capture unit 10 is configured for capturing at least one image of a subject (not shown), in this embodiment, the subject is a piece of paper, and is white in color. The image analysis unit 20 is configured for analyzing the quality of the image. The output unit 30 is configured for outputting the result of the quality of the image to determine the quality of the camera module. The camera module 100 can be, but is not limited to being, integrated into a mobile phone.

The image capture unit 10 includes a lens module 11 and an image sensor 12. The lens module 11 delivers an optical image to the image sensor 12. The lens unit 11 can be, for example, a zoom lens or a focus lens, and may include more than one lens. The image sensor 12 is a charge coupled device (CCD) image sensor or a complementary metal oxide semiconductor (CMOS) image sensor, and is packaged by a ceramic leaded chip carrier (CLCC), a plastic leaded chip carrier (PLCC), or a chip scale package (CSP). The image sensor 12 is configured for converting the optical image into a digital image. In this embodiment, the image capture unit 10 captures the image of the testing piece in a light box (not shown). In this embodiment, the light box is a container with a number of lightbulbs. The lightbulbs evenly illuminate the container and brightness in the light box can be adjusted according to testing requirements by adjusting the brightness of the lightbulbs.

The image analysis unit 20 includes a grayscale analysis subunit 21, a chrominance analysis subunit 22, a dead pixel analysis subunit 23, and an anomaly pattern analysis subunit 24.

The grayscale analysis subunit 21 is configured for analyzing grayscale values of the digital image transmitted from the image capture unit 10. The grayscale analysis subunit 21 pre-stores a number of grayscale ranges corresponding to various brightness conditions of the light box. To analyze the grayscale value of the digital image, the grayscale analysis subunit 21 calculates a grayscale value of each pixel of the digital image, based on a formula. In one example, the formula may be: Gray=0.299R+0.587G+0.114B (R: red; G: green; B: blue; of the pixel), then the grayscale analysis subunit 21 obtains an average value of the grayscale values of all the pixels and determines whether the average value falls into a corresponding grayscale range pre-stored by the grayscale analysis subunit 21 according to the brightness condition of the light box when the image is captured. If the average value falls into the corresponding grayscale ranges, the grayscale reproduction capability of the camera module 100 is considered acceptable, and otherwise the grayscale reproduction capability of the camera module 100 is considered unacceptable.

It should be noted that other color space calculations, such as YIQ, YUV, YCbCr, HSV, HSL and others may be employed to replace the method described above to calculate the average value of the grayscale value of all the pixels.

The chrominance analysis subunit 22 is configured for analyzing the chrominance of the digital image transmitted from the image capture unit 10. The chrominance analysis subunit 22 pre-stores a number of chrominance ranges corresponding to various brightness conditions of the light box. To analyze the chrominance value of the digital image, the chrominance value analysis subunit 22 calculates a chrominance value of each pixel of the digital image, according to CIE1931Yxy, CIE1976Lab, or other methods. The chrominance analysis subunit 22 calculates an average value of the chrominance values of all the pixels and determines whether the average value falls into a corresponding chrominance range pre-stored by the chrominance analysis subunit 22 according to the brightness condition of the light box when the image is captured. If the average value falls into the corresponding chrominance range, the chrominance inspecting capability of the camera module 100 is considered acceptable, otherwise the chrominance inspecting capability of the camera module 100 is considered unacceptable.

The dead pixel analysis subunit 23 is configured for locating dead pixels in the digital image transmitted from the image capture unit 10. In detail, the dead pixel analysis subunit 23 calculates a difference in brightness between every two adjacent pixels, and if the difference exceeds a preset value, such as 15% (the ratio of absolute value of the difference between the brightness of the center of pixel and the average brightness of eight adjacent pixels of the center pixel, and the average brightness of eight adjacent pixels of the center pixel) brightness lower or higher than adjacent pixels, the camera module 100 is considered to have dead pixels.

The anomaly pattern analysis subunit 24 is configured for analyzing whether anomaly patterns, such as water waves, exist in the digital image transmitted from the image capture unit 10. In detail, the anomaly pattern analysis subunit 24 divides the digital image into a number of regions. Each region includes N×N pixels or N×M pixels, N and M being two natural numbers. The anomaly pattern analysis subunit 24 calculates an average brightness of each region. The anomaly pattern analysis subunit 24 further calculates a difference in average brightness between every two adjacent regions and determines whether the difference exceeds a preset value, such as 5% lower or higher than adjacent regions (the ratio of absolute value of the difference between the brightness of the center of region and the average brightness of eight adjacent regions of the center region, and the average brightness of eight adjacent regions of the center region). If more than a preset number of differences exceeds the preset value, for example, if more than 4 differences occur, the camera module 100 is considered to have anomaly patterns.

The output unit 30 is configured for outputting the results of the grayscale analysis, the chrominance analysis, the dead pixel analysis, and the anomaly pattern analysis to a display screen of the camera module 100.

Figure 2:
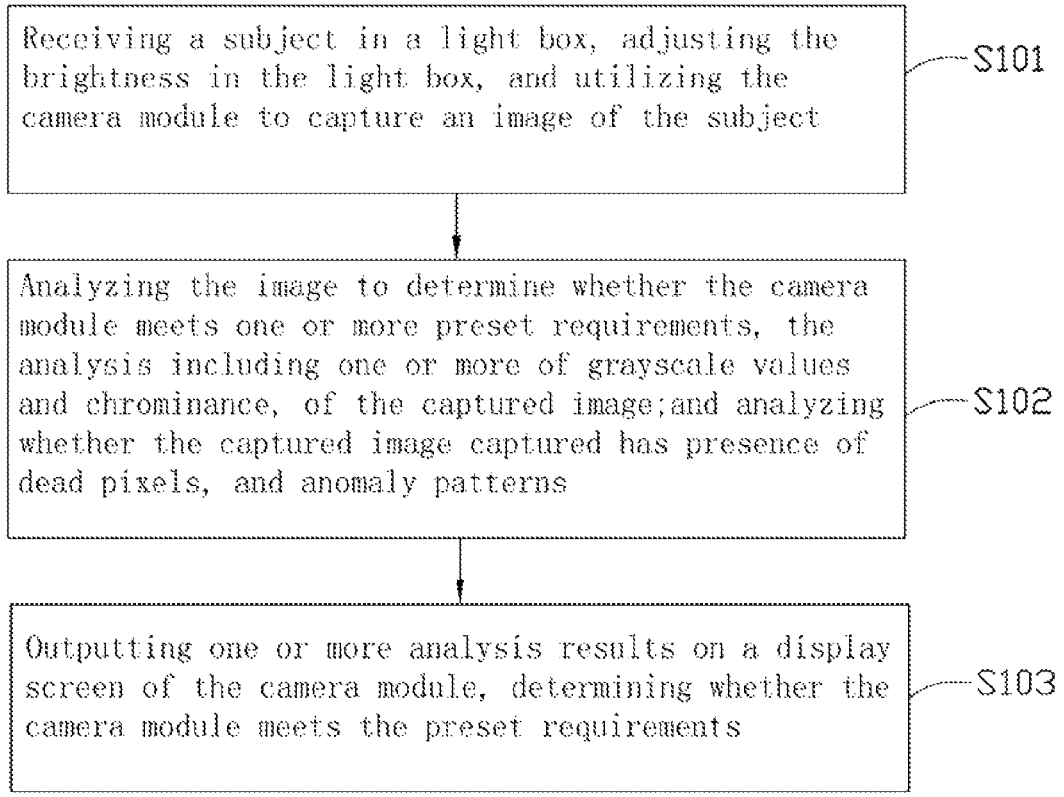
FIG. 2 is a flowchart of a testing method for camera modules, according to an exemplary embodiment.

FIG. 2 is a flowchart of a method for testing the camera module 100, as follows. In step S101, receiving a subject in a light box, where the brightness in the light box is adjusted, and the camera module 100 captures an image of the subject. In step S102, the image is analyzed to determine whether the camera module meets one or more preset requirements, based on one or more of the following aspects, including grayscale, and chrominance, locating dead pixels, and identifying anomaly patterns. In step S103: one or more analysis results are output to a display of the camera module, the displayed results are used to determine whether the camera module shows acceptable quality.

The camera module 100 provides quality testing by analyzing a captured image with no operator determination or visual inspection required, improving the efficiency of testing.

It will be understood that the above particular embodiments and methods are shown and described by way of illustration only. The principles and the features of the present invention may be employed in various and numerous embodiments thereof without departing from the scope of the invention as claimed. The above-described embodiments illustrate the scope of the invention but do not restrict the scope of the invention.

What is claimed is:

1. A camera module, comprising:
an image capture unit configured for capturing at least one image of a subject, the image capture unit capturing the image of the subject in a light box, the brightness of the light box being adjustable, and the subject being white in color;
an image analysis unit configured for analyzing the quality of the image to determine whether the camera module meets one or more preset requirements, the analysis including one or more grayscale values and chrominance of the captured image; and analyzing whether the captured image captured has presence of dead pixels, and anomaly patterns; and
an output unit configured for outputting the one or more analysis results to determine whether the camera module meets preset capability requirements;
wherein the image analysis unit comprises a grayscale analysis subunit pre-storing a plurality of grayscale ranges corresponding to various brightness conditions of the light box, the grayscale analysis subunit is configured for calculating a grayscale value of each pixel of the digital image, obtaining an average value of the grayscale values of all the pixels of the digital image and determining whether the average value falls into a corresponding grayscale range to generate an analysis result.

2. The camera module as claimed in claim 1, wherein the image capture unit comprises a lens module and an image sensor, the lens module is configured for delivering an optical image onto the image sensor, and the image sensor is configured for converting the optical image into a digital image.

3. The camera module as claimed in claim 1, wherein the camera module meets one of the preset requirements if the analysis result generated by the grayscale analysis subunit determines the average value falls into the corresponding grayscale range.

4. The camera module as claimed in claim 1, wherein the image analysis unit comprises a chrominance detection subunit pre-storing a plurality of chrominance ranges corresponding to various brightness conditions of the light box, the chrominance value analysis subunit configured for calculating a chrominance value of each pixel of the digital image, obtaining an average value of the chrominance values of all the pixels of the digital image and determining whether the average value falls into a corresponding chrominance range to generate an analysis results.

5. The camera module as claimed in claim 4, wherein the camera module meets one of the preset requirements if the analysis result generated by the chrominance detection subunit determines the average value falls into the corresponding chrominance range.

6. The camera module as claimed in claim 1, wherein the image analysis unit comprises a dead pixel detection subunit configured for calculating a difference in brightness between every two adjacent pixels of the digital image and determining whether the difference in brightness between any two adjacent pixels exceeds a preset value to generate an analysis result.

7. The camera module as claimed in claim 6, wherein the camera module meets one of the preset requirements if the analysis result generated by the dead pixel detection subunit determines the difference in brightness between any two adjacent pixels is less than the preset value.

8. The camera module as claimed in claim 1, wherein the image analysis unit comprises an anomaly pattern analysis subunit, configured for dividing the digital image into a plurality of regions, each region comprising a plurality of pixels, and calculating an average brightness of each region, the anomaly pattern analysis subunit further configured for calculating a difference in average brightness between every two adjacent regions, determining whether the difference in average brightness between any two adjacent regions exceeds a preset value and calculating a number of the differences to generate an analysis result.

9. The camera module as claimed in claim 8, wherein the camera module meets one of the preset requirements if the analysis result generated by anomaly pattern analysis subunit determines the number of the differences is less than a preset value.

10. A testing method for a camera module, the method comprising:
receiving a subject in a light box, the subject being a piece of paper and being white in color, adjusting the brightness in the light box, and utilizing the camera module to capture an image of the subject, wherein the camera module pre-stores a plurality of grayscale ranges corresponding to various brightness conditions of the light box, and pre-stores a plurality of chrominance ranges corresponding to various brightness conditions of the light box;

calculating a grayscale value of each pixel of the digital image, obtaining an average value of the grayscale values of all the pixels of the digital image and determining whether the average value falls into a corresponding grayscale range to generate an analysis result, and calculating a chrominance value of each pixel of the digital image, obtaining an average value of the chrominance values of all the pixels of the digital image and determining whether the average value falls into a corresponding chrominance range to generate another analysis result;

outputting the analysis results on a display screen of the camera module, determining whether the camera module meets the preset requirements.

11. The testing method as claimed in claim 10, further comprising: calculating a difference in brightness between every two adjacent pixels of the image, and determining whether the difference in brightness between any two adjacent pixels exceeds a preset value to generate an analysis result.

12. The testing method as claimed in claim 11, further comprising: dividing the image into a plurality of regions, each region comprising a plurality of pixels, calculating an average brightness of each region, determining whether the difference in average brightness between any two adjacent regions exceeds a preset value and calculating a number of the differences to generate an analysis result.

* * * * *